United States Patent
Bentz

[11] Patent Number: 5,895,535
[45] Date of Patent: Apr. 20, 1999

[54] APPARATUS AND METHOD FOR MEASURING WEB ALIGNMENT AT A SPLICE

[75] Inventor: Alan R. Bentz, Bergen, N.Y.

[73] Assignee: Eastman Kodak Company, Rochester, N.Y.

[21] Appl. No.: 08/936,355

[22] Filed: Sep. 24, 1997

[51] Int. Cl.$^6$ .................................................. B32B 31/00
[52] U.S. Cl. .................. 156/64; 156/351; 156/361; 226/20
[58] Field of Search .................. 156/64, 351, 361; 226/18, 19, 20; 364/469.01, 469.03, 469.04

[56] References Cited

U.S. PATENT DOCUMENTS

| | | | |
|---|---|---|---|
| 3,935,979 | 2/1976 | Hickey | 226/19 |
| 4,021,031 | 5/1977 | Meihofer et al. | 226/20 |
| 4,297,585 | 10/1981 | Puschmann | 250/560 |
| 4,381,586 | 5/1983 | Abler | 26/2 E |
| 4,392,910 | 7/1983 | Tokuno et al. | 156/361 |
| 4,652,329 | 3/1987 | Focke | 156/351 |
| 4,837,715 | 6/1989 | Ungpiyakul et al. | 364/469.03 |
| 5,045,134 | 9/1991 | Schenker et al. | 156/64 |
| 5,235,515 | 8/1993 | Ungpiyakul et al. | 364/469.04 |
| 5,271,284 | 12/1993 | Still et al. | 73/865.8 |
| 5,277,731 | 1/1994 | Krimsky et al. | 156/159 |
| 5,285,235 | 2/1994 | Frick | 355/41 |
| 5,305,099 | 4/1994 | Morcos | 348/88 |
| 5,437,749 | 8/1995 | Pipkorn et al. | 156/64 |
| 5,604,565 | 2/1997 | Takanashi | 355/40 |

OTHER PUBLICATIONS

"Gauge Measures Mismatch and Peaking at Welds", by Stephen S. Gordon, NASA Technical Briefs, Dec. 1996 p. 104.

*Primary Examiner*—James Engel
*Attorney, Agent, or Firm*—Susan L. Parulski

[57] ABSTRACT

An apparatus and method for measuring web alignment at a splice disposed between a trailing end of an expiring web and a leading end of a new web. The apparatus includes a speed monitor monitoring the moving webs. A splice sensor indicates the presence and absence of the splice while an edge sensor provides a signal indicating the position of the edge relative to a reference position. The edge signals are manipulated to provide a skew and offset value which provides a measurement of web alignment.

7 Claims, 5 Drawing Sheets

APPARATUS AND METHOD FOR MEASURING WEB ALIGNMENT AT A SPLICE

FIELD OF THE INVENTION

The present invention relates to the web alignment of web material, and more particularly, to an apparatus and method for measuring web alignment at a splice.

BACKGROUND OF THE INVENTION

When a web material is continuously fed from a plurality of successive rolls, the ends of the rolls may be spliced together to eliminate interruption to the web feed. Different types of splices can be formed, including a lap splice, a butt splice, and a gap splice. A lap splice is formed when a portion of an expiring web overlies a portion of a web from a new roll with the under surface of the overlapped portion of the one of the webs adhering to the upper surface of the other web. With a butt splice, the trailing end of the expiring web is in intimate contact with the leading end of the new web, but no overlap exists. A gap splice is formed when no overlap exists and the ends of the expiring web and new web are separated. For the butt splice and the gap splice, tape may be employed to connect the ends. U.S. Pat. No. 5,277,731 relates to the formation of a butt splice. U.S. Pat. No. 4,652,329 and U.S. Pat. No. 5,045,134 teach apparatus and methods for forming a splice.

The quality of the splice formed may affect subsequent processing of the web material. For example, if the web material is to be further processed, such as by the addition of a layer or coating, the quality of the splice may affect how the web material tracks or steers through the web handling equipment during the processing. The quality of the splice may also indicate when adjustments are needed to the splicing equipment and may provide an indication of impending mechanical problems with the splicing equipment. Thus, monitoring of the quality of the splice may be advantageous. Skew and offset are two characteristics which can be measured to provide an indication of web alignment at a splice.

NASA Tech Briefs, December 1996, page 104, relates to a gauge for measuring mismatch and peaking at welds. A hand-held tool is pressed against the weld bead to provide a measurement of the mismatch and peaking at a weld joint between two flat plates. While such apparatus may have achieved certain degrees of success in its particular application, the apparatus is not suited for flexible web material, particularly thin web material which is light sensitive. For example, contact of the gauge with photosensitive web material may cause scratches or abrasions. Further, the apparatus operates off-line, so would interrupt the manufacturing process.

U.S. Pat. No. 5,271,284 relates to a lap splice width monitor which senses the leading and trailing edge of a lateral splice and produces an indication of whether the total splice width is within a dimensional criteria. Such an apparatus, utilized in discrete processing, does not provide a measurement of the characteristics of a formed splice, for example, skew and offset.

U.S. Pat. No. 4,297,585 relates to a system for the detection of splicing defects in film. The system is directed toward detecting defects causes by improperly located splices and improperly sized gaps between adjacent film strips. While such a system may detect defects, the system does not provide a quality of the splice whereby a measure of web alignment is obtained.

Accordingly, there exists a need for an apparatus and method which provides for the measurement of web alignment at a splice, for example, skew and offset. There is a further need for such an apparatus and method which provides for the measurement of characteristics of a splice on-line, so that the web feed does not need to be interrupted and since the tension applied during transport may affect the characteristics of the splice. Further, such apparatus and method should be suited for high speed transport applications, and for flexible web material, such as photosensitive film or paper. Still further, the measurements should be able to be made without physical contact with the web material.

SUMMARY OF THE INVENTION

An object of the invention is to provide an apparatus and method for measuring web alignment at a splice.

Another object of the invention is to provide such an apparatus and method which operates on-line during transport of the web material, without interruption to the transport of the web material.

Yet another object of the invention is to provide such an apparatus and method which does not adversely affect the web material, such as by making physical contact with the web material.

Still another object of the invention is to provide such an apparatus and method which is suitable for high speed applications employing flexible web material, particularly photosensitive film or paper.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided an a method of transporting the expiring web and the new web along a web path at a pre-determined rate of movement. The method includes determining a position of the edge of the expiring web and new web relative to a reference position; generating a signal indicative of the edge position of the expiring web and new web and corresponding the edge position signal to a reference time $T_i$; storing the edge position signal and the corresponding reference time in a data stream; detecting the presence of a splice at a splice detection time $T_{splice}$; retrieving from the data stream the stored edge position signals immediately about the splice detection time $T_{splice}$ according to a pre-determined time increment; and manipulating the retrieved edge position signals to determine web alignment.

According to another aspect of the invention, there is provided an apparatus for measuring web alignment at a splice disposed between a trailing end of an expiring web and a leading end of a new web, the expiring web and new web each having an edge. The apparatus includes a transporter for transporting the expiring web and new web along a web path. The rate of movement of the expiring web and new web along the web path are monitored by a speed monitor monitoring, which provides a speed signal corresponding thereto. A splice sensor provides a splice signal indicative of a splice state and a non-splice state, while an edge sensor provides an edge signal indicative of the position of the edge of the expiring web and new web relative to a reference position. A computer manipulates the splice signal, the expiring web edge signal, and the new web edge signal to provide the measurement of web alignment.

The apparatus and method of the present invention provide for on-line measurement of the characteristics of a web alignment at a splice, including the measurement of skew and offset. The measurements are provided without interruption to the web transport and without physical contact with the web material. It is suitable for high speed applications employing flexible web material, such as photosensitive film or paper.

BRIEF DESCRIPTION OF THE DRAWING

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1A:
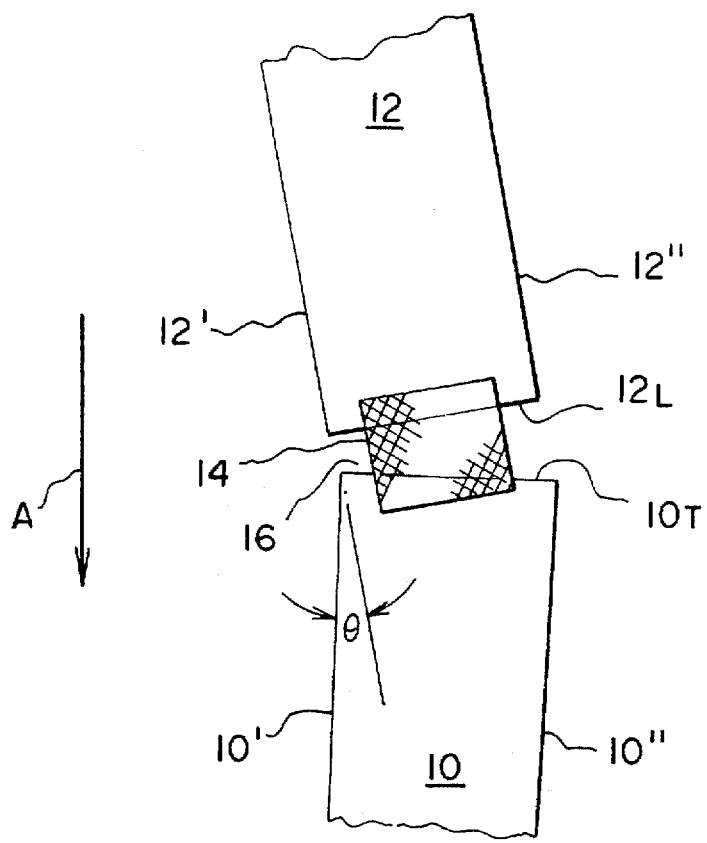
FIGS. 1(a) and 1(b) show an expiring length of web and new length of web spliced together by a splice.

The following is a detailed description of the preferred embodiments of the invention, reference being made to the drawings in which the same reference numerals identify the same elements of structure in each of the several figures.

Figure 1B:
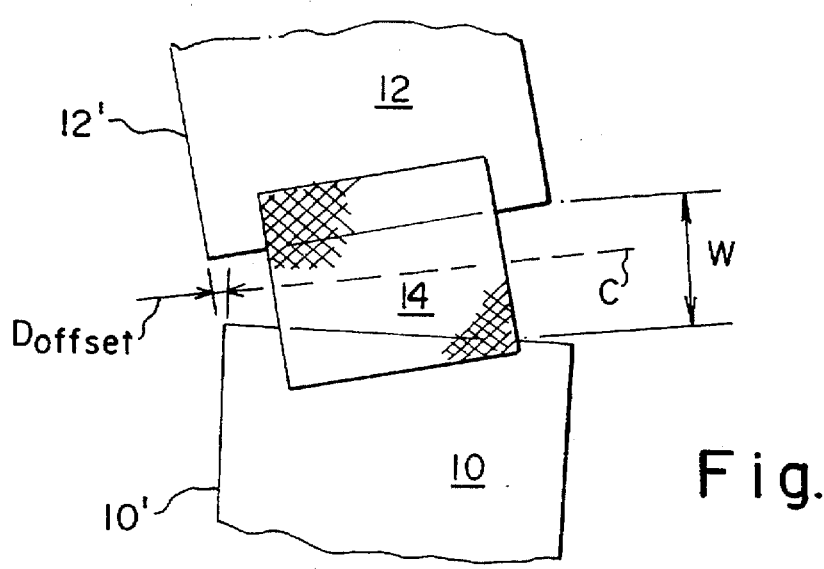

FIGS. 1(a) and 1(b) show a first length 10 of web material from an expiring roll (hereinafter referred to as expiring length 10), and a second length 12 of web material from a new roll (hereinafter referred to as new length 12 ) being transported in a direction A. A trailing end $10_T$ expiring length 10 and a leading end $12_L$ of new length 12 are spliced together by a splice 14, such as tape, which bridges across a gap 16 disposed between lengths 10,12. While a gap splice is illustrated, other splices may be employed, such as a butt splice or a lap splice. Expiring length 10 has a first and second lateral edge 10',10", respectively, while new length 12 similarly has a first and second lateral edge 12',12", respectively.

Splice 14 may or may not be centered on gap 16. Further, splice 14 may or may not be contained within gap 16. For example, splice 14 may extend beyond edges 10',10" or 12',12". In addition, the angular orientation of trailing end $10_T$ relative to expiring length edge 10',10" may not be perpendicular. Similarly, the angular orientation of leading end $12_L$ relative to expiring length edge 12',12" may not be perpendicular.

Skew and offset are two characteristics which can be measured to provide an indication of lateral web alignment at a splice. Splice skew is herein defined as an angle formed by the edges of the expiring length and the new length. As illustrated in FIG. 1(a), skew is an angle θ formed by edge 10' of expiring length 10 and edge 12' of new length 12. Assuming that the edges of the lengths are substantially parallel (i.e., 10' is substantially parallel to 10", and 12' is substantially parallel to 12"), skew could be measured at either edge. Offset is defined as a distance $D_{offset}$ between the edges of the expiring length and new length at the location of the splice measured relative to a splice center reference position. For example, offset $D_{offset}$ is shown in FIG. 1(b). For the example shown in FIG. 1(b), a splice reference line C is selected for gap 16 having a width W. The offset $D_{offset}$ is the distance along splice reference line C between edges 10',12'. A "perfect" splice has substantially no skew (e.g., skew angle θ is approximately 0 degrees or 180 degrees) and substantially no offset (e.g., $D_{offset}$ is approximately zero).

Figure 3:
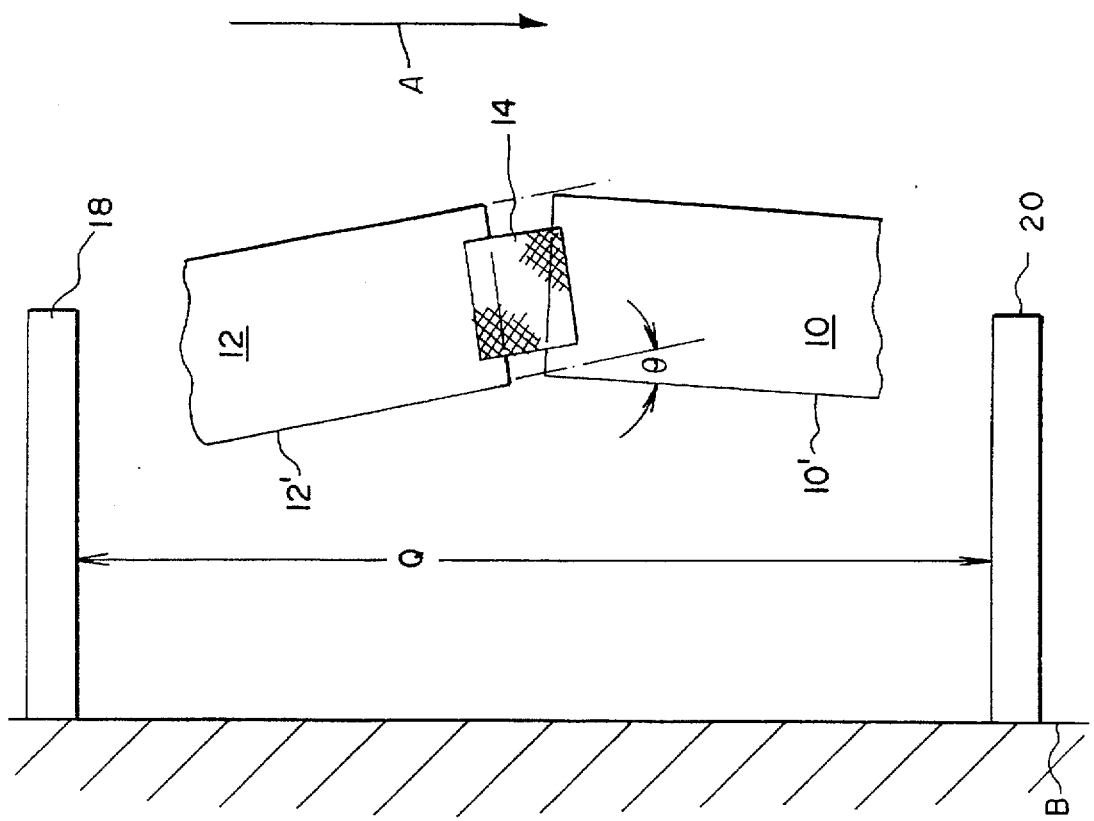
FIGS. 2 and 3 generally show an apparatus according to the present invention.
Figure 2:
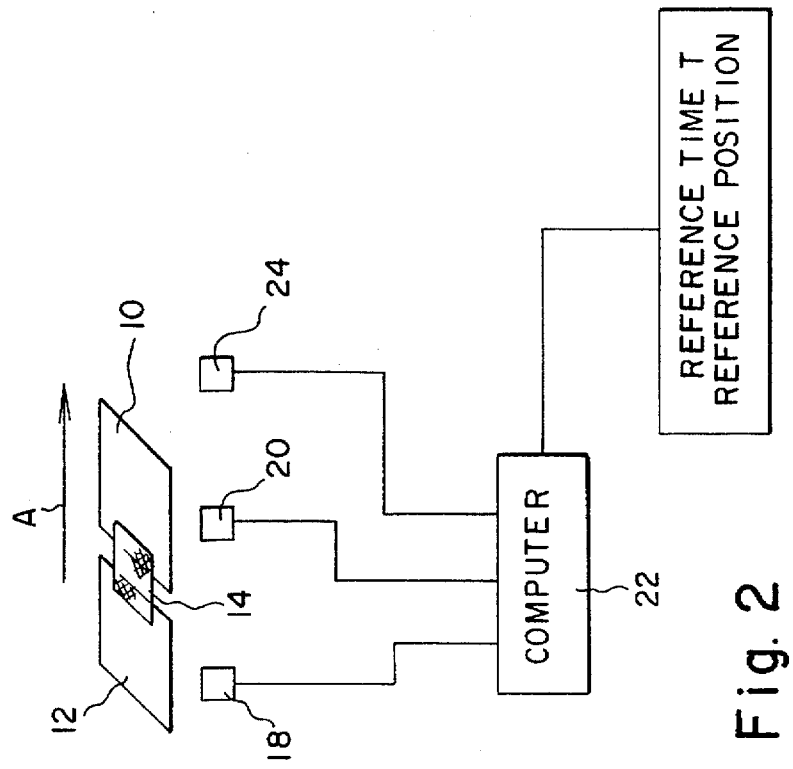

The apparatus of the present invention is generally illustrated in FIGS. 2 and 3. Expiring length 10 and new length 12 travel along a web path in direction A, relative to a reference position B. A splice sensor 18 is disposed along the web path to detect the presence of splice 14. At least one edge sensor 20 is disposed on one side of the lengths along the web path for detecting a position (e.g., distance) of the edges 10',12' of lengths 10,12 relative to a reference position B disposed perpendicular to the direction of web travel. Splice sensor 18 and edge sensor 20 are spaced from each other by a pre-determined distance Q. Sensors 18,20 may be optical, capacitive, ultrasonic, pneumatic, or any other suitable sensors. For the application wherein web material is photosensitive, sensors 18,20 must be operable in non-white light conditions. It will be understood from the description below that splice sensor 18 and edge sensor 20 may be disposed at any position along the web path and either upstream or downstream of each other. For ease of discussion, splice sensor 20 is downstream of edge sensor 18, as illustrated.

Splice sensor 18 provides either (i) a splice signal indicative of a splice state indicating the presence of a splice or (ii) a non-splice state indicating the absence of a splice. Edge sensor 20 provides an edge signal indicative of a position of the edges 10',12' of the expiring web and new web relative to a reference position. First, the position of edge 10' of expiring length 10 is provided, then the position of edge 12' of new length 12. These position signals are provided to a central processing unit (CPU) such as a computer 22, which manipulates the collected signal to provide a measurement of web alignment at splice 14.

Referring now to FIGS. 1–3, in operation, expiring length 10 and new length 12 are transported along the web path in direction A. A speed monitor 24 monitors the rate of movement in the direction of travel of expiring length 10 and new length 12, and provides a speed signal corresponding thereto to computer 22. As lengths 10,12 are transported, a reference time T is noted. At each reference time T, speed monitor 24 monitors the speed, and splice sensor 18 sends a signal indicative of the presence or absence of splice 14. In addition, edge sensor 20 sends a signal indicative of the position of the edge relative to reference position B, either expiring length 10 or new length 12. This data is stored by computer 22 in a data stream. The speed from speed monitor 24 and the pre-determined distance Q allow the data from splice sensor 18 and edge sensor 20 to be corresponded for a particular segment of web material.

The web speed does not require continuous monitoring if the web speed is substantially constant.

To obtain a measurement of web alignment, a reference time $T_{splice}$ is noted when splice 14 is detected by splice sensor 18. Splice reference line C is noted at the position corresponding to reference time $T_{splice}$. Edge position data collected by edge sensor 20 about reference time $T_{splice}$ is retrieved from computer 22.

The retrieved edge position data is mapped into x,y coordinate pairs. The y-coordinate corresponds to a distance from reference position B. The x-coordinate corresponds to the reference time, or alternatively, a corresponding relative distance from splice reference line C.

A first equation is mapped to the edge data representing edge 10' of expiring length 10 and a second equation is mapped to the edge data representing edge 12' of new length 12.

The equation representing edge 10' of expiring length 10 about reference time $T_{splice}$ is:

$$E = m_e T + b_e \quad \text{(Equation 1)}$$

wherein E is the edge position in units of distance (e.g., inches); T is the x-coordinate which is a reference time or relative distance from splice reference line C; $m_e$ is a slope of the line; and $b_e$ is a y-intercept constant.

The equation representing edge 12' of new length 12 about reference time $T_{splice}$ is:

$$E = m_n T + b_n \quad \text{(Equation 2)}$$

wherein E is the edge position in units of distance (e.g., inches); T is the x-coordinate which is a reference time or relative distance from splice reference line C; $m_n$ is a slope of the line; and $b_n$ is a y-intercept constant.

To reduce noise and other transport or equipment aberrations affecting the edge data signals, a portion of the edge data immediately about splice 14 (correspondingly, about time $T_{splice}$) may be filtered or unused. Various mathematical techniques are then employed to fit a line to the remaining edge data, for example, a least-square method.

Figure 4:
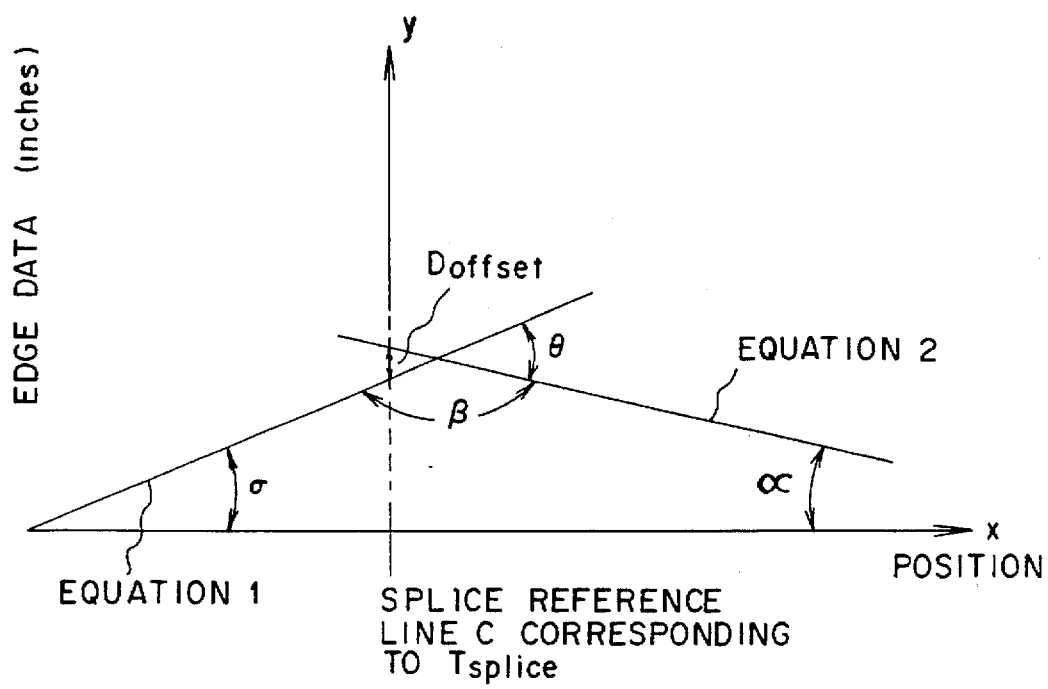
FIG. 4 shows a plot of reference time versus edge data for determining skew and offset according to the present invention.

FIG. 4 illustrates a plot of Equations 1 and 2. From this plot, skew $\theta$ and offset $D_{offset}$ may be determined according to the following equations.

The angles are associated by:

$$\sigma + \beta + \alpha = 180 \text{ degrees} \quad \text{(Equation 3)}$$

$$\beta + \theta = 180 \text{ degrees} \quad \text{(Equation 4)}$$

thus:

$$\theta = \sigma + \alpha \quad \text{(Equation 5)}$$

Since a $\sigma = \arctan(m_e)$ and $\alpha = -\arctan(m_n)$, then $$\theta = \arctan(m_e) - \arctan(m_n) \quad \text{(Equation 6)}$$

Offset $D_{offset}$ is defined as the difference of the edge positions at time $T_{splice}$. In FIG. 4, this value is shown as being along the y-axis.

EXAMPLE

An example of the present invention is now provided which is suitable for photosensitive web material being transported at a high rate of speed.

FIGS. 5(a) through 5(e) illustrate lengths 10,12 relative to splice sensor 18 and edge sensor 20 as the lengths are transported along direction A. As lengths 10,12 are transported, splice sensor 18 continuously provides a splice signal indicative of a splice state (presence) and a non-splice state (absence). Similarly, edge sensor 20 continuously provides a signal indicative of the position of the edges (e.g., the distance to the web edge). The splice signal, edge signal, and a corresponding reference time $T_i$ are stored in a data stream. A mark "*" is shown on a portion of expiring web 10 to more particularly illustrate the operation of the invention.

Figure 5A:
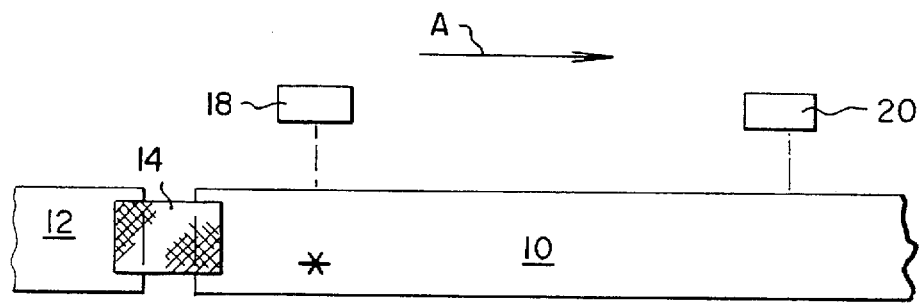
FIGS. 5(a) through 5(e) show a relationship between a moving length of expiring web and new web and a stationary splice sensor and edge sensor.
Figure 5B:
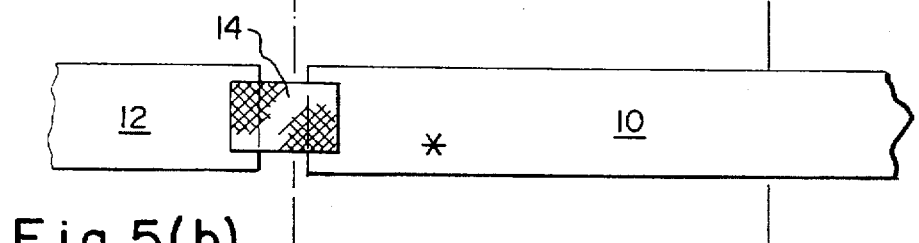
Figure 5C:
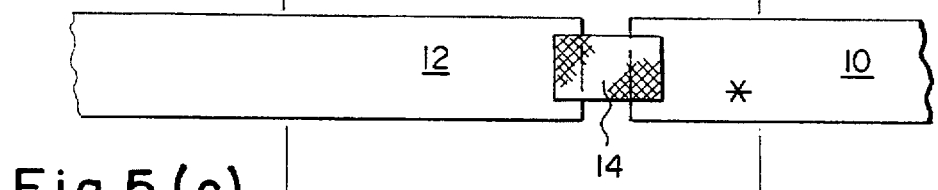

As illustrated in FIG. 5(a), edge sensor 20 is adjacent expiring web 10. Splice sensor 18 is adjacent a portion of expiring web 10 marked by *, and thus is not detecting a splice. Therefore, splice sensor 18 indicates a non-splice state. As the lengths are further transported to the position shown in FIG. 5(b), splice sensor 18 senses splice 14. This time is referenced as splice detection time $T_{splice}$ and splice sensor 18 provides computer 22 with a splice state indicating the presence of splice 14.

Figure 5D:
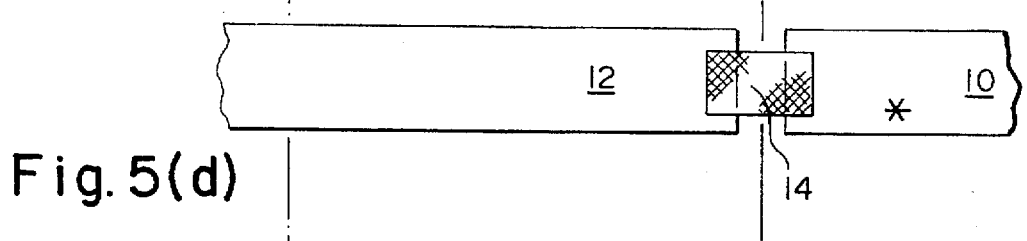
Figure 5E:
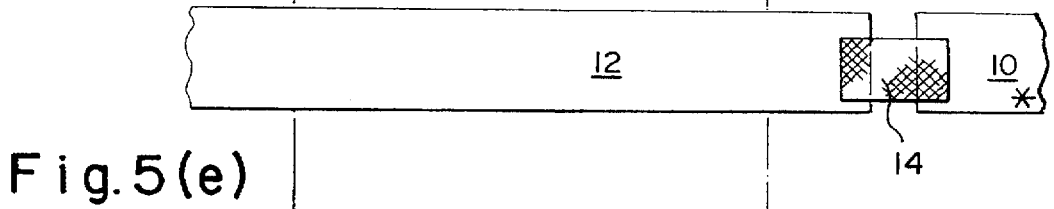

Lengths 10,12 are further transported, and the area of the lengths which are of interest (i.e., the area about the splice over which the skew and offset values will be determined), are being sensed by edge sensor 20. For example, in FIG. 5(c), the portion of expiring web marked by * is now sensed by edge sensor 20. Referring to FIG. 5(d), lengths 10,12 are further transported, splice 14 becomes adjacent edge sensor 20. Still further transport of lengths 10,12, the area of interest is passing edge sensor 20, as shown in FIG. 5(e). The elapsed times between the figures of FIGS.(a) through (e) are calculable from distance Q and the monitored speed.

To measure web alignment, the stored edge position signal immediately about splice reference time $T_{splice}$ is retrieved from the data stream according to a pre-determined time increment. That is, the stored edge position signals in a pre-determined time increment prior to and following splice detection time $T_{splice}$ are retrieved. Since splice sensor 18 is a pre-determined distance Q from edge sensor 20, and the web speed is monitored by speed monitor 24, the edge data of the particular length of web of interest can be retrieved from the data stream.

Figure 6:
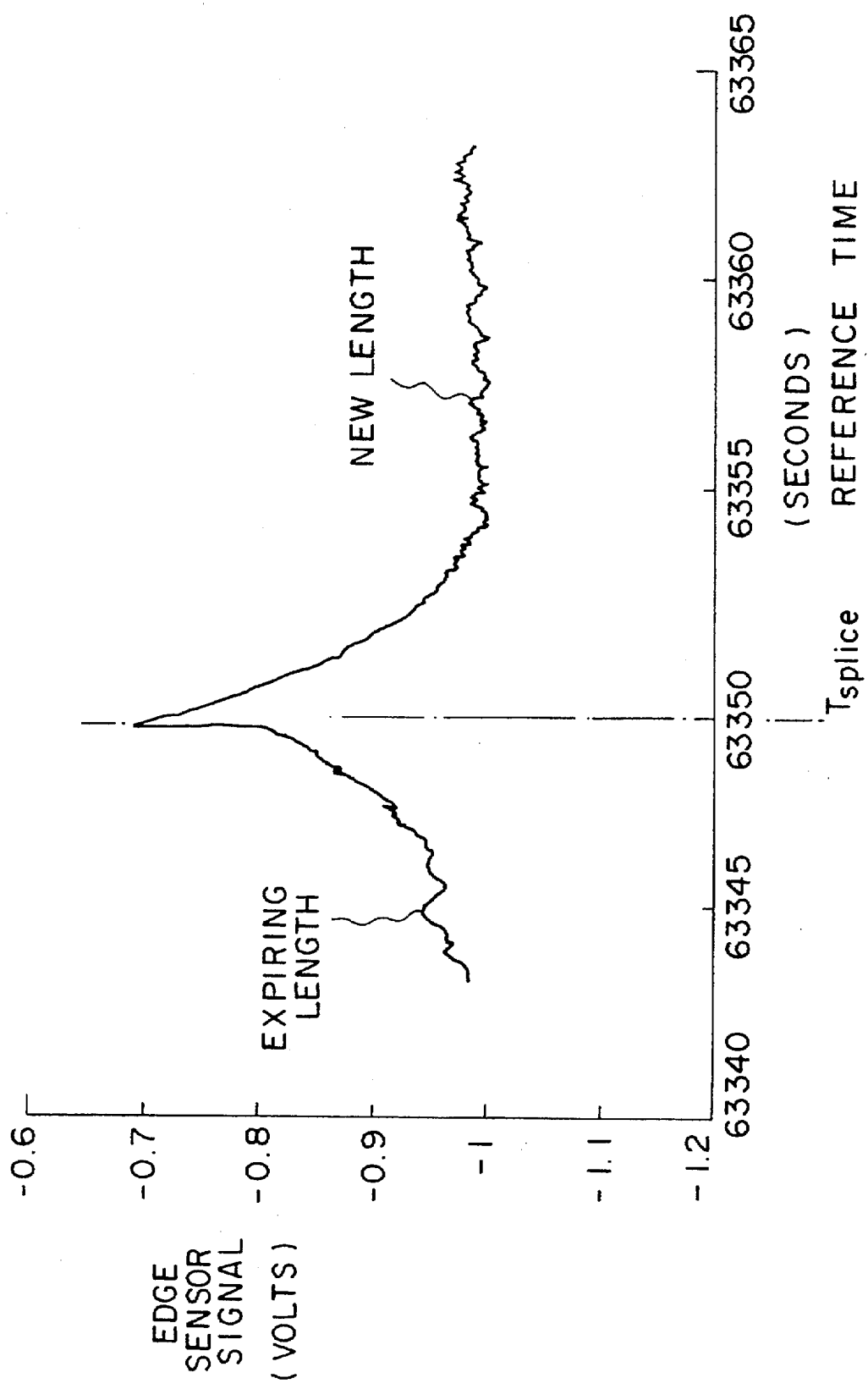
FIG. 6 shows a plot of reference time versus edge position signals.

For example, FIG. 6 shows a plot of the signal from edge sensor 20 of edges 10',12' as a function of the reference time. As illustrated in the figure, splice 14 was adjacent splice sensor 18 at about reference time 63350. A pre-determined time increment corresponding to a length of approximately 5 feet was selected by the user. Therefore, the edge position signals for 5 feet of expiring length 10 (i.e., 5 feet of length 10 disposed adjacent splice 14) and 5 feet of new length 12 (i.e., 5 feet of length 12 disposed adjacent splice 14) are retrieved.

As can be seen from FIG. 6, aberrations occur about the splice. Accordingly, the signals provided by edge sensor 18 immediately about the splice may be omitted. For this particular example, a length increment of about 9 inches was selected. Thus, the edge data signals immediately prior to and following about 9 inches of splice 14 (i.e., about 9 inches of expiring length and 9 inches of new length) are omitted.

The retrieved edge data is then filtered, mathematically mapped, and reduced to the linear equation for each length. For example, for the expiring length shown in FIG. 6, filtering is accomplished by averaging the remaining data and then removing a specific data point which is farthest from the average. This process is repeated until a particular criteria is met, for example, until a maximum difference is less than a pre-determined value (for example, based on noise characteristics of the edge sensor signals) or until a particular number of edge position signals are removed (for example, 20 percent).

Once the edge data is filtered, mapping is accomplished by converting the edge data signals, which were in units of volts, to a length unit using a calibration. Similarly, the reference time $T_i$ is converted from time units to length units using the web speed. From this data, a plot is provided of edge position versus distance from the splice (e.g., splice reference line C) along the direction of web travel, both axes having the same units (i.e., units of length, inches). In this particular example, a best fit, least squares method is applied to the data to provide Equation 1 for expiring length 10:

$$E = m_e T + b_e \quad \text{(Equation 7)}$$

wherein E is the edge data in units of length, and T is the distance from the splice (e.g., splice reference line C) along the direction of web travel in units of length.

The edge data for the new length is similarly filtered, mathematically mapped, and reduced. Equation 2 is fit to the data for new length 12:

$$E = m_n T + b_n \quad \text{(Equation 8)}$$

Figure 7:
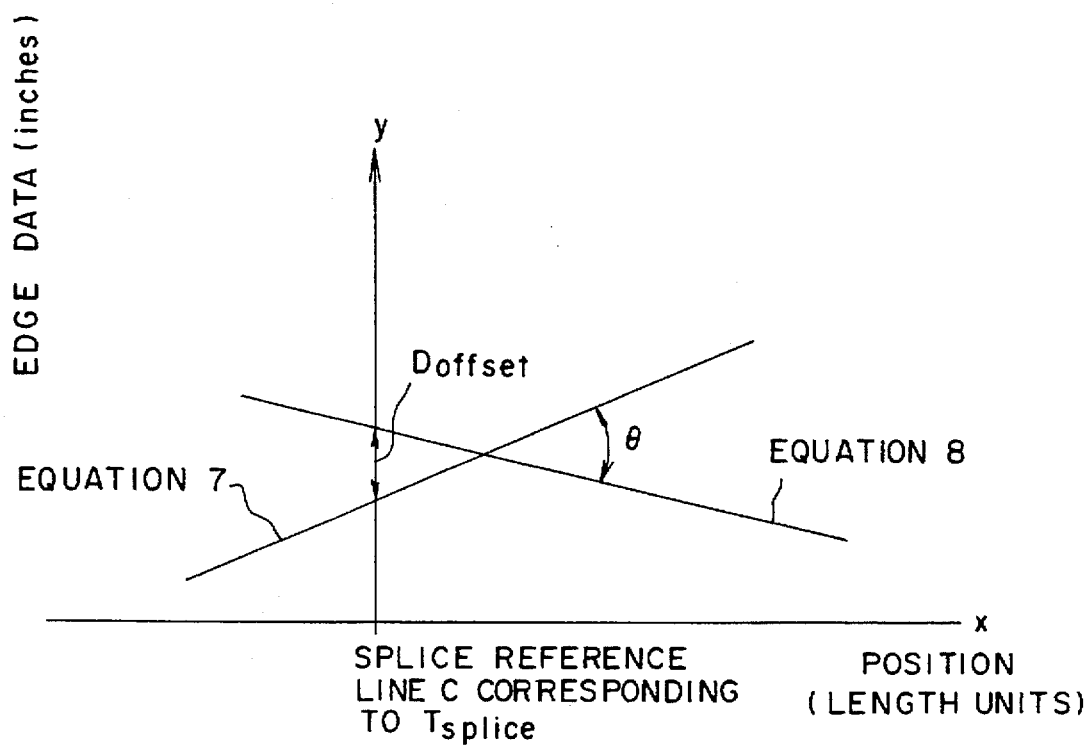
FIG. 7 shows a plot of reference time versus edge data for determining skew and offset for an example according to the present invention.

Equations 7 and 8 are plotted in FIG. 7. As illustrated, the value of $D_{offset}$ is determined to be:

$$D_{offset} = b_e - b_n \quad \text{(Equation 9)}$$

wherein $D_{offset}$ has units of length.

From the plot of FIG. 7, the angular value of skew is determined using Equation 6:

$$\theta = \arctan(m_e) - \arctan(m_n) \quad \text{(Equation 10)}$$

wherein $\theta$, $m_e$, and $m_n$ have units of radians or degrees.

Measuring skew and offset on-line provides an actual indication of web alignment in a tensioned, manufacturing environment, which may differ from an untensioned, off-line environment. For example, Applicants have noted a tensioned splice tends to demonstrate a reduced amount of skew than an untensioned splice.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for measuring lateral web alignment at a splice disposed between a trailing end of an expiring web and a leading end of a new web, the expiring web and new web each having a lateral edge, comprising:

transporting the expiring web and the new web along a web path at a pre-determined rate of movement;

determining a position of the edge of the expiring web and a position of the edge of the new web relative to a reference position;

generating a signal indicative of the edge position of the expiring web and the edge position of the new web and corresponding the edge position signal to a reference time $T_i$;

storing the edge position signal and the corresponding reference time in a data stream;

detecting the presence of a splice at a splice detection time $T_{splice}$;

retrieving from the data stream the stored edge position signals immediately about the splice detection time $T_{splice}$ according to a pre-determined time increment; and manipulating the retrieved edge position signals to determine lateral web alignment of the edge of the expiring web and the edge of the new web.

2. The method according to claim 1 wherein the retrieved edge position signals are filtered to remove aberrations.

3. An apparatus for measuring lateral web alignment at a splice disposed between a trailing end of an expiring web and a leading end of a new web, the expiring web and new web each having a lateral edge, comprising:

a transporter transporting the expiring web and new web along a web path;

a speed monitor monitoring the rate of movement of the expiring web and new web along the web path, and providing a speed signal corresponding thereto;

a splice sensor providing a splice signal indicative of a splice state and a non-splice state;

an edge sensor providing a lateral edge signal indicative of the position of the lateral edge of the expiring web and the lateral edge position of the new web relative to a reference position, the splice sensor being disposed at a pre-determined distance from the edge sensor; and a computer manipulating the splice signal, the expiring web lateral edge signal, and the new web lateral edge signal to provide the measurement of web alignment.

4. The apparatus according to claim 3 wherein the computer provides a value of skew $\theta$ and offset $D_{offset}$.

5. A method for measuring web alignment at a splice disposed between a trailing end of an expiring web and a leading end of a new web, the expiring web and new web each having an edge, comprising:

transporting the expiring web and the new web along a web path at a pre-determined rate of movement;

determining a position of the edge of the expiring web and a position of the edge of the new web relative to a reference position;

generating a signal indicative of the edge position of the expiring web and the edge position of the new web and corresponding the edge position signal to a reference time $T_i$;

storing the edge position signal and the corresponding reference time in a data stream;

detecting the presence of a splice at a splice detection time $T_{splice}$;

retrieving from the data stream the stored edge position signals immediately about the splice detection time $T_{splice}$ according to a pre-determined time increment; and manipulating the retrieved edge position signals to determine a value of skew $\theta$ and offset $D_{offset}$.

6. A method for measuring web alignment at a splice disposed between a trailing end of an expiring web and a leading end of a new web, the expiring web and new web each having an edge, comprising:

transporting the expiring web and the new web along a web path at a pre-determined rate of movement;

determining a position of the edge of the expiring web and a position of the edge of the new web relative to a reference position;

generating a signal indicative of the edge position of the expiring web and the edge position of the new web and corresponding the edge position signal to a reference time $T_i$;

storing the edge position signal and the corresponding reference time in a data stream;

detecting the presence of a splice at a splice detection time $T_{splice}$;

retrieving from the data stream the stored edge position signals immediately about the splice detection time $T_{splice}$ according to a pre-determined time increment;

mapping an equation to the edge position signals of the expiring web according to an equation $E = m_e T + b_e$ wherein $m_e$ is the slope of the equation and $b_e$ is a constant;

mapping an equation to the edge position signals of the new web according to an equation $E=m_n T+b_n$ wherein $m_n$ is the slope of the equation and $b_n$ is a constant of the equation;

determining an offset value $D_{offset}$ according to the equation $D_{offset}=b_e-b_n$; and determining a skew angle $\theta$ according to the equation $\theta=\arctan(m_e)-\arctan(m_n)$.

7. The method according to claim 6 wherein $b_e$ and $b_n$ represent an extrapolated edge position of the expiring web and new web, respectively, at eh splice.

* * * * *